United States Patent
Ahn et al.

(10) Patent No.: US 10,894,535 B2
(45) Date of Patent: Jan. 19, 2021

(54) BRAKE APPARATUS FOR VEHICLE

(71) Applicant: HYUNDAI MOBIS CO., LTD., Seoul (KR)

(72) Inventors: Sung Ki Ahn, Yongin-si (KR); Soung Jun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/506,055

(22) Filed: Jul. 9, 2019

(65) Prior Publication Data
US 2020/0017092 A1 Jan. 16, 2020

(30) Foreign Application Priority Data
Jul. 11, 2018 (KR) .................. 10-2018-0080770

(51) Int. Cl.
*B60T 13/14* (2006.01)
*B60T 13/16* (2006.01)
*B60T 11/28* (2006.01)

(52) U.S. Cl.
CPC ............. *B60T 13/147* (2013.01); *B60T 11/28* (2013.01); *B60T 13/16* (2013.01)

(58) Field of Classification Search
CPC ...... B60T 8/4081; B60T 8/368; B60T 8/4031; B60T 11/28; B60T 13/147; B60T 13/16; B60T 13/686
See application file for complete search history.

(56) References Cited

U.S. PATENT DOCUMENTS

| | | | | |
|---|---|---|---|---|
| 5,066,073 A | * | 11/1991 | Frigger | ................... B60T 8/446 303/122.09 |
| 6,446,435 B1 | * | 9/2002 | Willmann | ............. B60T 13/686 60/533 |
| 9,061,670 B2 | * | 6/2015 | Strengert | ................ B60T 8/267 |
| 9,193,341 B2 | * | 11/2015 | Bresser | ................ B60T 8/4872 |
| 9,216,723 B2 | * | 12/2015 | Baumann | ............. B60T 8/4086 |

(Continued)

FOREIGN PATENT DOCUMENTS

| JP | 2017-25873 A | 2/2017 |
|---|---|---|
| KR | 10-2013-0102923 A | 9/2013 |

(Continued)

*Primary Examiner* — Thomas W Irvin
(74) *Attorney, Agent, or Firm* — Knobbe Martens Olson & Bear LLP (57) ABSTRACT

A brake apparatus for a vehicle may include a master cylinder unit including a master cylinder, which has first and second outlets and is configured to generate braking hydraulic pressure by receiving the operating force of a brake pedal, and a storage tank configured to store brake oil and supply the same to the master cylinder; a hydraulic pump unit, which is configured to generate braking hydraulic pressure and which includes multiple hydraulic pumps installed to alternately perform a suction operation and a discharge operation; a wheel cylinder unit configured to brake vehicle wheels by receiving the brake hydraulic pressure from the master cylinder unit or the hydraulic pump unit; and first and second flow path units configured to supply the braking hydraulic pressure to the wheel cylinder unit by respectively connecting the first outlet and the second outlet of the master cylinder unit with the wheel cylinder unit.

4 Claims, 7 Drawing Sheets

(56) References Cited

U.S. PATENT DOCUMENTS

| | | | | |
|---|---|---|---|---|
| 9,315,182 B2* | 4/2016 | Kuhlman | ............... | B60T 13/147 |
| 9,738,263 B2* | 8/2017 | Jung | ............... | B60T 13/662 |
| 9,827,960 B2* | 11/2017 | Feigel | ............... | B60T 8/4013 |
| 9,988,035 B2* | 6/2018 | Kim | ............... | B60T 17/221 |
| 2011/0049972 A1* | 3/2011 | Tsuji | ............... | B60T 8/4081 |
| | | | | 303/10 |
| 2013/0292997 A1* | 11/2013 | Strengert | ............... | B60L 7/26 |
| | | | | 303/6.01 |
| 2013/0342005 A1* | 12/2013 | Baumann | ............... | B60T 13/168 |
| | | | | 303/10 |
| 2014/0167496 A1* | 6/2014 | Bresser | ............... | B60T 8/4872 |
| | | | | 303/116.1 |
| 2015/0232076 A1* | 8/2015 | Oosawa | ............... | B60T 13/662 |
| | | | | 303/10 |
| 2015/0375728 A1* | 12/2015 | Kuhlman | ............... | B60T 8/4072 |
| | | | | 303/9.61 |
| 2016/0075318 A1* | 3/2016 | Ahn | ............... | B60T 13/686 |
| | | | | 303/10 |
| 2016/0272178 A1* | 9/2016 | Feigel | ............... | B60T 8/4081 |
| 2017/0050629 A1* | 2/2017 | Kim | ............... | B60T 13/686 |

FOREIGN PATENT DOCUMENTS

| | | |
|---|---|---|
| KR | 10-2013-0119109 A | 10/2013 |
| KR | 10-2015-0059035 | 5/2015 |

* cited by examiner

BRAKE APPARATUS FOR VEHICLE

CROSS-REFERENCES TO RELATED APPLICATIONS

The present application claims priority to Korean application number 10-2018-0080770, filed on Jul. 11, 2018, which is incorporated by reference in its entirety.

BACKGROUND OF THE INVENTION

The present invention relates to a brake apparatus for a vehicle, and more particularly, to a brake apparatus for a vehicle, which is capable of improving pump utilization efficiency, minimizing the amplitude of pulsation, implementing a pedal simulator function, and securing required braking performance with a small number of valves.

Recently, hybrid vehicles, fuel cell vehicles, electric vehicles, and the like are actively developed in order to improve fuel efficiency and to reduce exhaust emissions. These vehicles necessarily require a brake apparatus, that is, a brake apparatus for decreasing the speed of a driving vehicle or stopping the vehicle.

A brake apparatus of a conventional electronic control brake system includes a vacuum brake, which generates braking force using suction pressure of an engine, and a hydraulic brake, which generates braking force using hydraulic pressure. Also, with the development of cutting-edge safe driving systems, an additional function capable of Autonomous Emergency Braking (AEB) in the event of emergency during driving of a vehicle is developed.

Recently, an ESC-integrated brake system, in which Electronic Stability Control (ESC) enabling active braking is integrated in a conventional brake system, has been proposed.

The ESC-integrated brake system secures the stability of a vehicle by operating the functions of an Anti-lock Brake System (ABS), Vehicle Dynamics Control (VDC) and a Traction Control System (TCS) when the stability of the vehicle is reduced while the vehicle is driving straight, turning, or climbing a slope.

In order to improve the performance of a brake system, research is being carried out so as to increase the number of pumps and the capacity of a motor. However, an increase in the number of pumps and the increased capacity of a motor may increase the costs and weight and adversely affect peripheral electric parts (an ECU and the like).

The related art of the present invention is disclosed in Korean Patent Application Publication No. 10-2013-0102923 published on Sep. 23, 2013 and entitled "Electronic hydraulic brake device".

SUMMARY OF THE INVENTION

Embodiments of the present invention are directed to a brake apparatus for a vehicle, which may improve pump utilization efficiency, minimize the amplitude of pulsation, implement a pedal simulator function, and secure required braking performance with a small number of valves.

A brake apparatus for a vehicle in accordance with the present invention may include a master cylinder unit including a master cylinder, which has a first outlet and a second outlet and is configured to generate braking hydraulic pressure by receiving the operating force of a brake pedal, and a storage tank, which is configured to store brake oil therein and to supply the brake oil to the master cylinder by being connected with the master cylinder; a hydraulic pump unit, which is configured to generate the braking hydraulic pressure separately from the master cylinder unit and which includes multiple hydraulic pumps installed so as to alternately perform a suction operation and a discharge operation by being interlocked with each other; a wheel cylinder unit configured to brake vehicle wheels by being supplied with the braking hydraulic pressure from the master cylinder unit or the hydraulic pump unit; a first flow path unit configured to supply the braking hydraulic pressure to the wheel cylinder unit by connecting the first outlet of the master cylinder unit with the wheel cylinder unit; and a second flow path unit configured to supply the braking hydraulic pressure to the wheel cylinder unit by connecting the second outlet of the master cylinder unit with the wheel cylinder unit.

Also, the wheel cylinder unit may include first and second wheel cylinders and third and fourth wheel cylinders, the first flow path unit may supply the braking hydraulic pressure to the first and second wheel cylinders by connecting the first outlet of the master cylinder with the first and second wheel cylinders, and the second flow path unit may supply the braking hydraulic pressure to the third and fourth wheel cylinders by connecting the second outlet of the master cylinder with the third and fourth wheel cylinders.

Also, the multiple hydraulic pumps may comprise an even number of hydraulic pumps so as to alternately perform the suction operation and the discharge operation by being interlocked with each other through an eccentric bearing, and each of the multiple hydraulic pumps may have a single flow path formed by combining a suction flow path and a discharge flow path.

Also, the even number of hydraulic pumps may include first and second hydraulic pumps, which are installed so as to alternately perform the suction operation and the discharge operation by being interlocked with each other, and third and fourth hydraulic pumps, which are installed so as to alternately perform the suction operation and the discharge operation by being interlocked with each other.

Also, the brake apparatus may further include a third flow path unit, configured to connect the storage tank with the first and second hydraulic pumps, and a fourth flow path unit, configured to connect the storage tank with the third and fourth hydraulic pumps.

Also, the brake apparatus may further include a fifth flow path unit, configured to supply the braking hydraulic pressure to the first and second wheel cylinders by connecting the third flow path unit with the first and second wheel cylinders, and a sixth flow path unit, configured to supply the braking hydraulic pressure to the third and fourth wheel cylinders by connecting the fourth flow path unit with the third and fourth wheel cylinders.

Also, the fifth flow path unit and the sixth flow path unit may be connected with each other via a connection valve.

Also, in the master cylinder unit, a pedal stroke sensor configured to sense the operation of the brake pedal may be installed.

Also, the brake apparatus may further include a seventh flow path unit configured to connect the master cylinder with the storage tank such that the brake oil of the master cylinder is transferred to the storage tank. A control valve configured to control the seventh flow path unit may be installed in the seventh flow path unit, and the control valve may control the seventh flow path unit such that a braking operation is performed based on the driver's required braking force sensed by the pedal stroke sensor.

Also, a first traction control valve and a second traction control valve may be installed in the first flow path unit and the second flow path unit, respectively, the first traction control valve and the second traction control valve being configured to brake the vehicle wheels by supplying the braking hydraulic pressure generated by the master cylinder to the wheel cylinder.

DESCRIPTION OF SPECIFIC EMBODIMENTS

Hereinafter, an embodiment of a brake apparatus for a vehicle in accordance with the present will be described with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
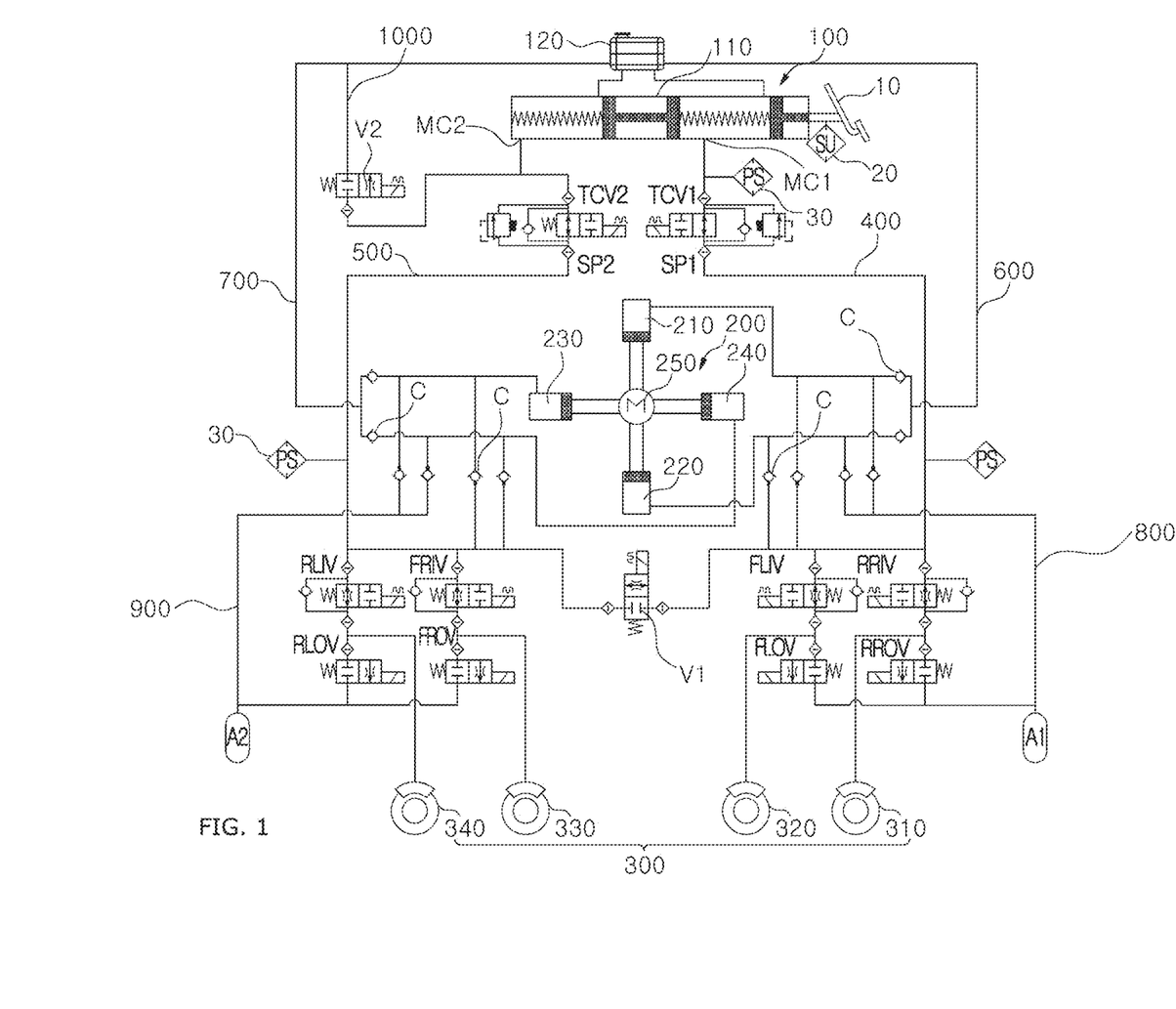
FIG. 1 is a hydraulic circuit diagram illustrating a brake apparatus for a vehicle in accordance with an embodiment of the present invention.
Figure 2:
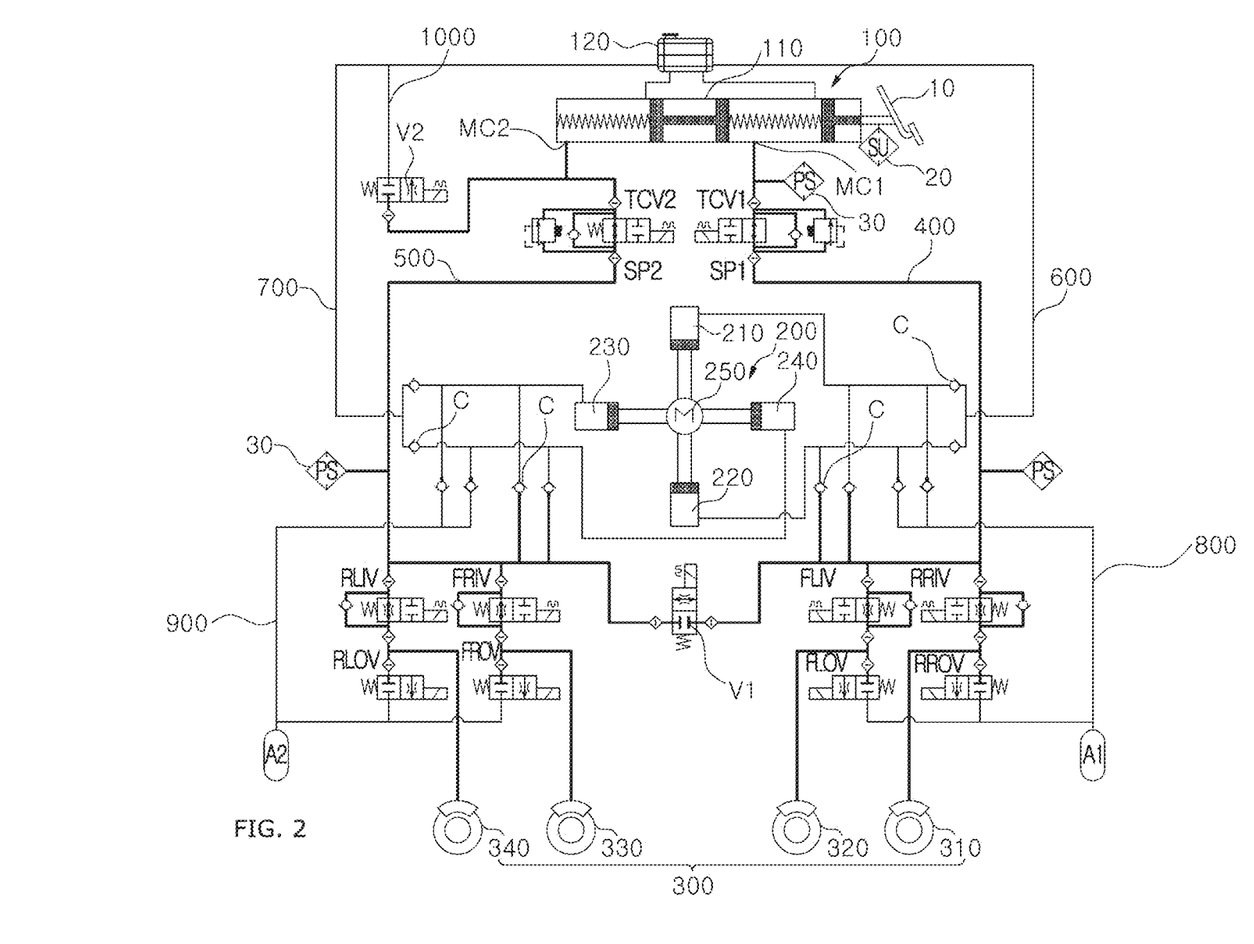
FIG. 2 is a hydraulic circuit diagram illustrating a brake apparatus for a vehicle in accordance with an embodiment of the present invention and is a view illustrating a brake mode of a Conventional Brake System (CBS) when power is not applied.
Figure 3:
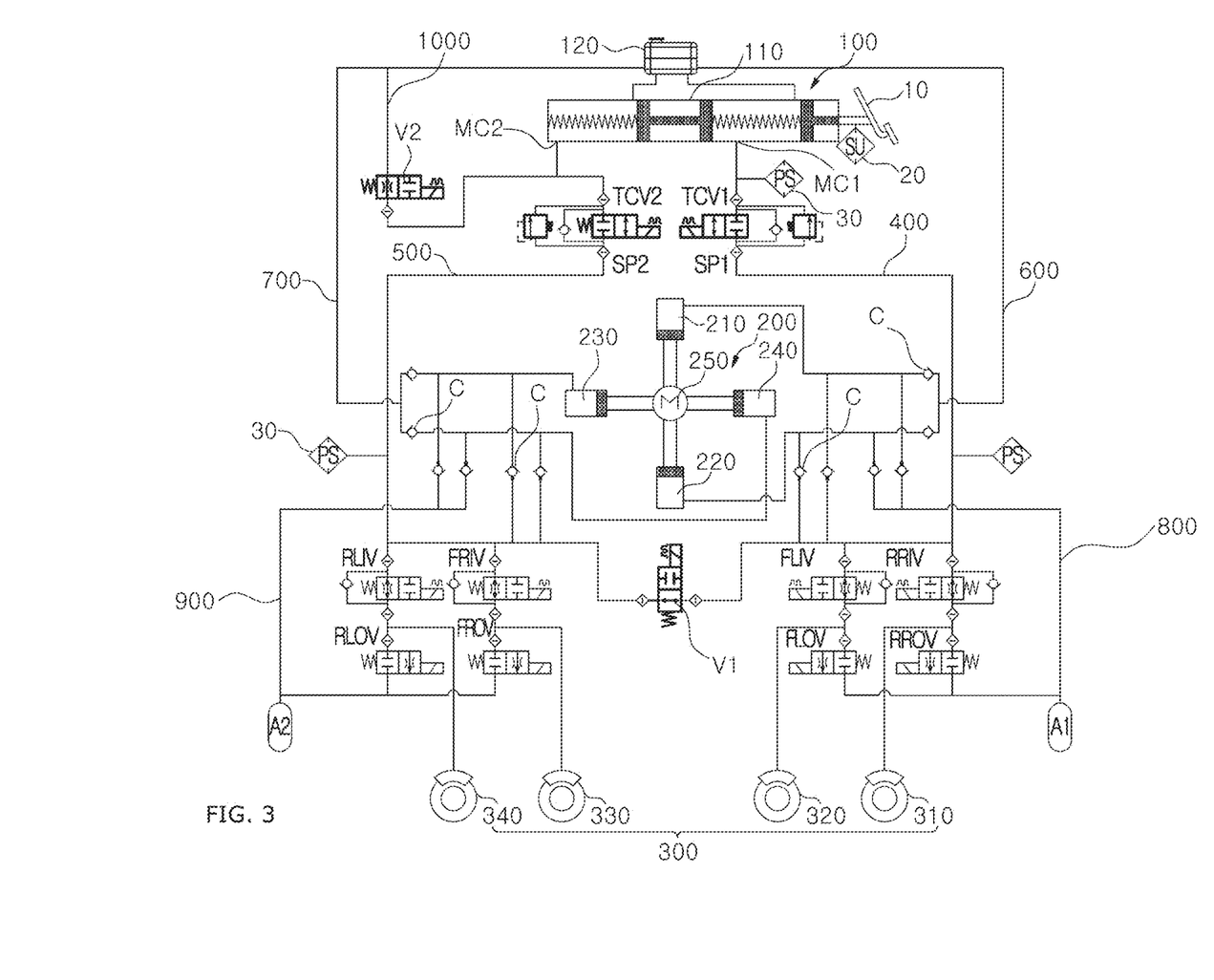
FIG. 3 is a hydraulic circuit diagram illustrating a brake apparatus for a vehicle in accordance with an embodiment of the present invention and is a view illustrating a mode in which the vehicle is driving without braking when power is applied.
Figure 4:
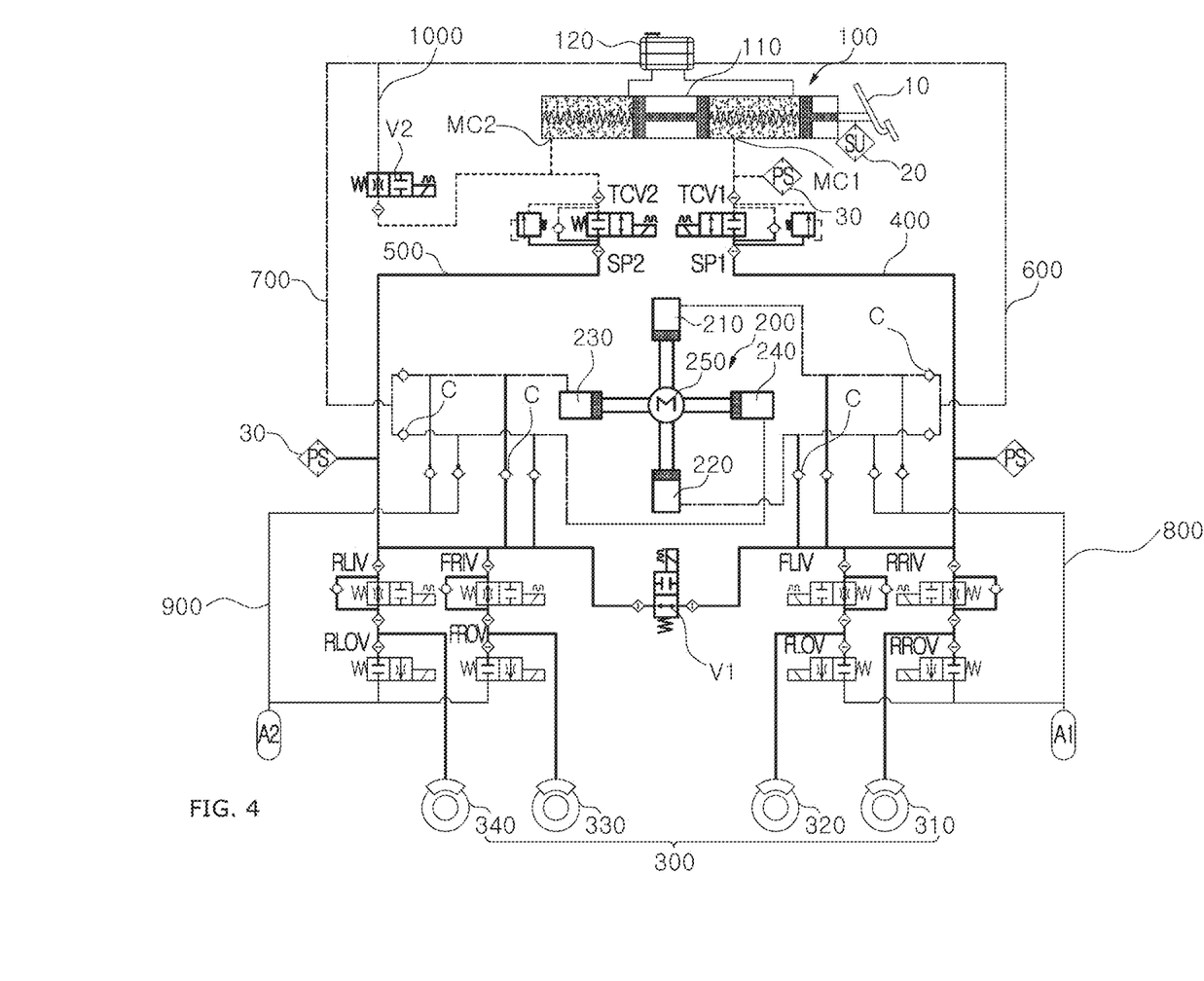
FIG. 4 is a hydraulic circuit diagram illustrating a brake apparatus for a vehicle in accordance with an embodiment of the present invention and is a view illustrating a brake mode of a CBS when power is applied.
Figure 5:
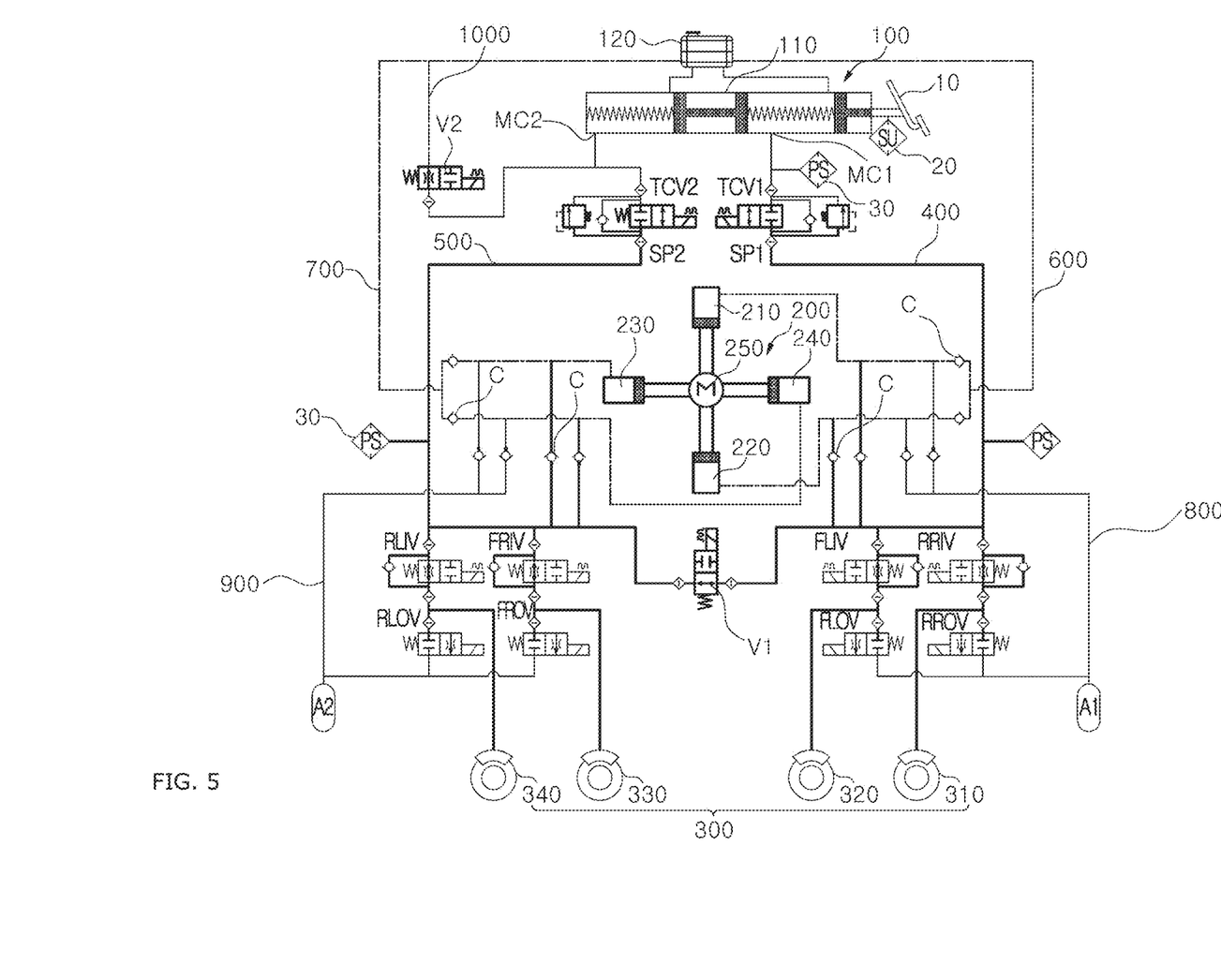
FIG. 5 is a hydraulic circuit diagram illustrating a brake apparatus for a vehicle in accordance with an embodiment of the present invention and is a view illustrating a state in which a pressure-increase mode is forcibly applied through Vehicle Dynamics Control (VDC) in a mode in which the vehicle is driving with braking when power is applied.
Figure 6:
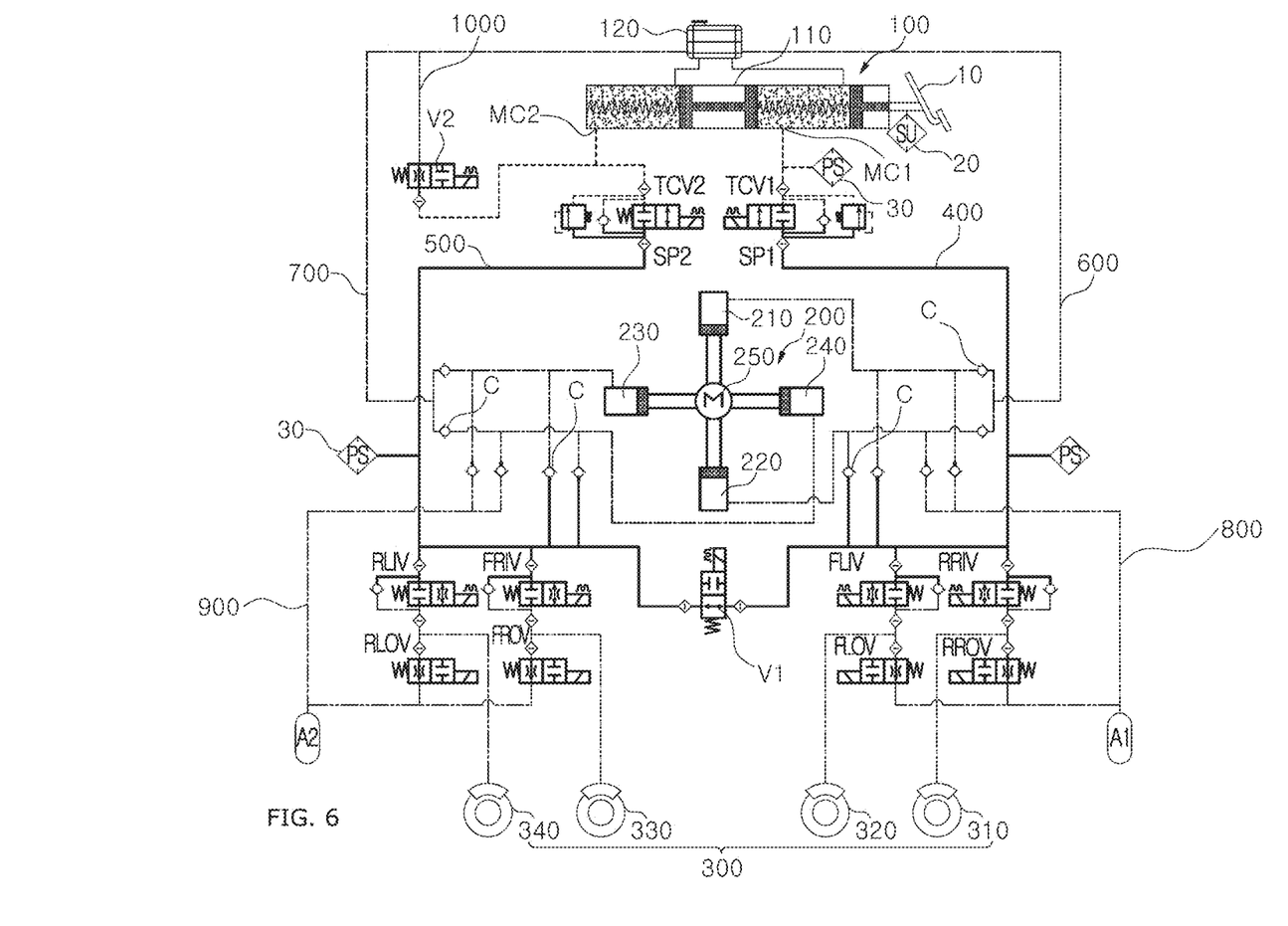
FIG. 6 is a hydraulic circuit diagram illustrating a brake apparatus for a vehicle in accordance with an embodiment of the present invention and is a view illustrating a state in which ABS cooperative control is applied in the event of wheel lock in a brake mode of a CBS when power is applied.
Figure 7:
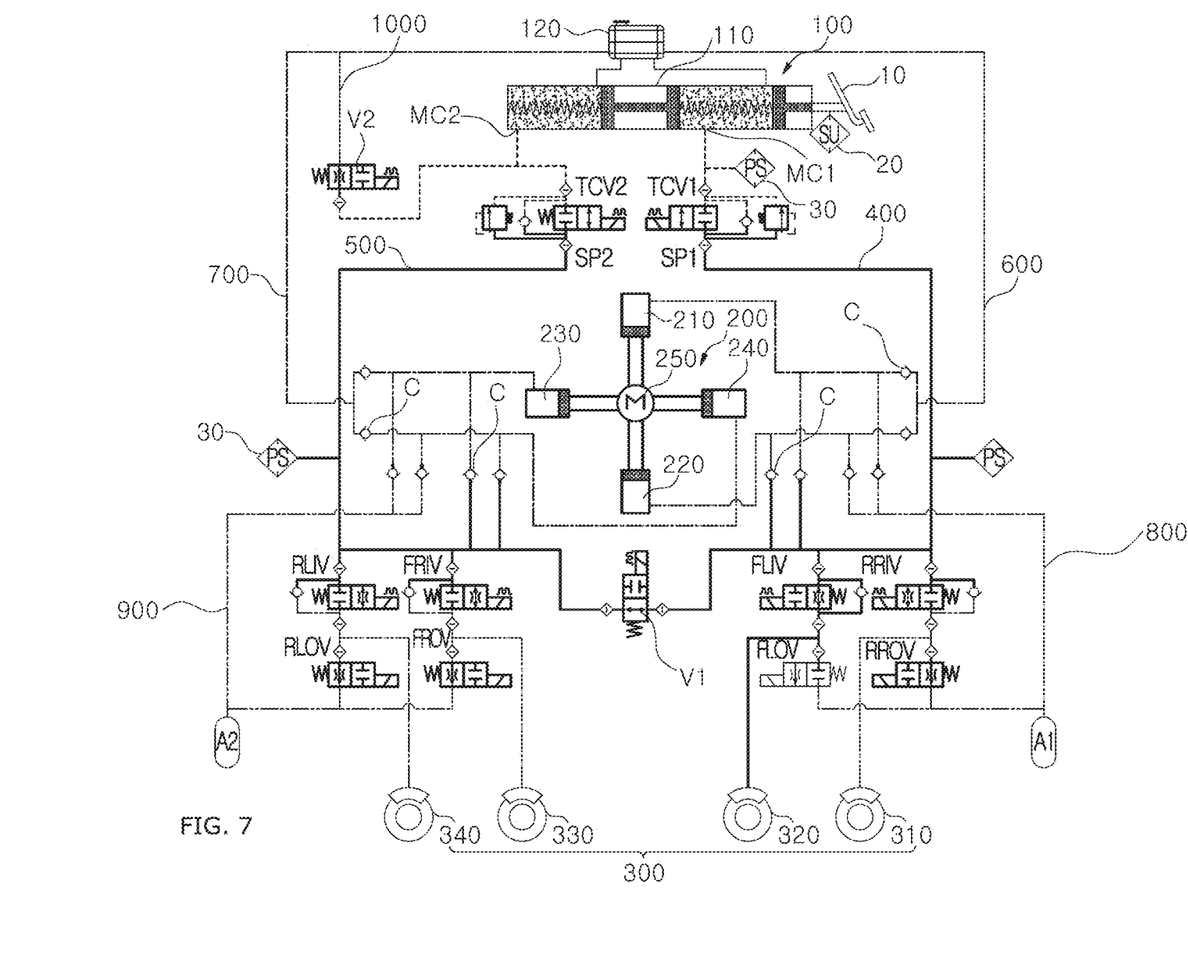
FIG. 7 is a hydraulic circuit diagram illustrating a brake apparatus for a vehicle in accordance with an embodiment of the present invention and is a view illustrating a state in which pressure-increase control is applied to a wheel requiring a pressure increase during ABS cooperative control.

FIG. 1 is a hydraulic circuit diagram illustrating a brake apparatus for a vehicle in accordance with an embodiment of the present invention, FIG. 2 is a hydraulic circuit diagram illustrating a brake apparatus for a vehicle in accordance with an embodiment of the present invention and is a view illustrating a CBS brake mode when power is not applied, FIG. 3 is a hydraulic circuit diagram illustrating a brake apparatus for a vehicle in accordance with an embodiment of the present invention and is a view illustrating a mode in which the vehicle is driving without braking when power is applied, FIG. 4 is a hydraulic circuit diagram illustrating a brake apparatus for a vehicle in accordance with an embodiment of the present invention and is a view illustrating a CBS brake mode when power is applied, FIG. 5 is a hydraulic circuit diagram illustrating a brake apparatus for a vehicle in accordance with an embodiment of the present invention and is a view illustrating a state in which a pressure-increase mode is forcibly applied through VDC in a mode in which the vehicle is driving with braking when power is applied, FIG. 6 is a hydraulic circuit diagram illustrating a brake apparatus for a vehicle in accordance with an embodiment of the present invention and is a view illustrating a state in which ABS cooperative control is applied in the event of wheel lock in a CBS brake mode when power is applied, and FIG. 7 is a hydraulic circuit diagram illustrating a brake apparatus for a vehicle in accordance with an embodiment of the present invention and is a view illustrating a state in which pressure-increase control is applied to a wheel requiring a pressure increase during ABS cooperative control.

Referring to FIG. 1, the brake apparatus for a vehicle in accordance with the present invention includes a master cylinder unit 100, including a master cylinder 110, which has a first outlet MC1 and a second outlet MC2 and is configured to generate braking hydraulic pressure by receiving the operating force of a brake pedal 10, and a storage tank 120 configured to store brake oil and supply brake oil to the master cylinder 110 by being connected with the master cylinder 110, a hydraulic pump unit 200, which is configured to generate braking hydraulic pressure separately from the master cylinder unit 100 and which includes first and second hydraulic pumps 210 and 220 installed so as to alternately perform a suction operation and a discharge operation by being interlocked with each other and third and fourth hydraulic pumps 230 and 240 installed so as to alternately perform a suction operation and a discharge operation by being interlocked with each other, a wheel cylinder unit 300 configured to brake vehicle wheels by being supplied with braking hydraulic pressure from the master cylinder unit 100 or the hydraulic pump unit 200, a first flow path unit 400 configured to supply braking hydraulic pressure to the wheel cylinder unit 300 by connecting the first outlet MC1 of the master cylinder 110 with the wheel cylinder unit 300, a second flow path unit 500 configured to supply braking hydraulic pressure to the wheel cylinder unit 300 by connecting the second outlet MC2 of the master cylinder 110 with the wheel cylinder unit 300, a third flow path unit 600 configured to connect the storage tank 120 with the first and second hydraulic pumps 210 and 220, and a fourth flow path unit 700 configured to connect the storage tank 120 with the third and fourth hydraulic pumps 230 and 240.

In the first flow path unit 400 and the second flow path unit 500, inlet valves RLIV, FRIV, FLIV and RRIV for increasing the pressure of the wheel cylinder unit 300, which brakes vehicle wheels, and outlet valves RLOV, FROV, FLOV and RROV for decreasing the pressure of the wheel cylinder unit 300 are installed.

The wheel cylinder unit 300 includes first and second wheel cylinders 310 and 320 and third and fourth wheel cylinders 330 and 340, the first flow path unit 400 supplies braking hydraulic pressure to the first and second cylinders 310 and 320 by connecting the first outlet MC1 of the master cylinder unit 100 with the first and second cylinders 310 and 320, and the second flow path unit 500 supplies braking hydraulic pressure to the third and fourth wheel cylinders 330 and 340 by connecting the second outlet MC2 of the master cylinder unit 100 with the third and fourth wheel cylinders 330 and 340.

The braking apparatus for a vehicle in accordance with the present invention may further include a fifth flow path unit 800 configured to supply braking hydraulic pressure to the first and second wheel cylinders 310 and 320 by connecting the third flow path unit 600 with the first and second wheel cylinders 310 and 320.

Also, a sixth flow path unit 900 configured to supply braking hydraulic pressure to the third and fourth wheel cylinders 330 and 340 by connecting the fourth flow path unit 700 with the third and fourth wheel cylinders 330 and 340 may further included.

In the third flow path unit 600 and the fourth flow path unit 700, multiple check valves C are installed so as to transfer braking hydraulic pressure in a fixed direction regardless of the operating states of the first and second hydraulic pumps 210 and 220 and the third and fourth hydraulic pumps 230 and 240.

In the fifth flow path unit 800 and the sixth flow path unit 900, pressure accumulators A1 and A2 capable of draining the hydraulic pressure of the wheel cylinder unit 300.

The fifth flow path unit 800 may be connected with the sixth flow path unit 900 via a connection valve V1. Because the fifth flow path unit 800 is connected with the six flow path unit 900 depending on the operation of the connection valve V1, the first and second hydraulic pumps 210 and 220 and the third and fourth hydraulic pumps 230 and 240 may be used in common in the third flow path unit 600 and the fourth flow path unit 700, whereby pump utilization efficiency may be improved and the amplitude of pulsation may be minimized.

The first and second hydraulic pumps 210 and 220 and the third and fourth hydraulic pumps 230 and 240 are connected so as to be operated by a single driving motor 250. The first and second hydraulic pumps 210 and 220 and the third and fourth hydraulic pumps 230 and 240 are configured with reciprocating pistons. Based on the rotation of an eccentric bearing during one rotation of the driving motor 250, the first and second hydraulic pumps 210 and 220 alternately perform a suction operation and a discharge operation, and the third and fourth hydraulic pumps 230 and 240 also alternately perform a suction operation and a discharge operation.

Also, the first and second hydraulic pumps 210 and 220 have a single flow path formed by combining a suction flow path and a discharge flow path, and the third and fourth hydraulic pumps 230 and 240 have a single flow path formed by combining a suction flow path and a discharge flow path. Multiple check valves C are installed in the respective flow paths such that braking hydraulic pressure is transferred in a fixed direction.

Accordingly, when the first hydraulic pump 210 or the third hydraulic pump 230 performs a suction operation (a discharge operation), the second hydraulic pump 220 or the fourth hydraulic pump 240 performs a discharge operation (a suction operation).

Because the suction flow path and the discharge flow path are combined so as to form a single flow path in the respective hydraulic pumps, additional valves are not required, whereby the number of components may be reduced and the effect of reducing the costs may be acquired. Also, a pulsation problem caused due to the operation of valves may be solved.

In the master cylinder unit 100, a pedal stroke sensor 20 configured to sense the operation of the brake pedal 10 may be installed.

Also, a seventh flow path unit 1000 configured to connect the master cylinder 110 with the storage tank 120 may be further included such that brake oil of the master cylinder 110 is transferred to the storage tank 120.

In the seventh flow path unit 1000, a control valve V2 configured to control the seventh flow path unit 1000 may be installed. The control valve V2 controls the seventh flow path unit 1000 such that a brake operation is performed based on braking requirement by a driver when the pedal stroke sensor 20 senses the braking requirement.

The first and second hydraulic pumps 210 and 220 and the third and fourth hydraulic pumps 230 and 240 generate braking hydraulic pressure using the brake oil transferred to the storage tank 120 and transfer the braking hydraulic pressure to a wheel cylinder that requires increased braking force.

In the first flow path unit 400 and the second flow path unit 500, pressure sensors are installed. Also, a first traction control valve TCV1 and a second traction control valve TCV2, which are configured to brake vehicle wheels by supplying the braking hydraulic pressure generated by the master cylinder 110 to the wheel cylinder unit 300 regardless of the driver's intention to operate the brake pedal 10, are installed in the first flow path unit 400 and the second flow path unit 500, respectively.

Through control of the first traction control valve TCV1, the second traction control valve TCV2, and the control valve V2, a pedal simulator function may be implemented.

The brake apparatus for a vehicle in accordance with an embodiment of the present invention may secure required braking performance with a smaller number of valves (i.e., twelve valves as in the existing ESC system) than the integrated-ESC system, which uses fifteen valves.

Hereinafter, the operation of a brake apparatus for a vehicle in accordance with an embodiment of the present invention will be described with reference to FIGS. 2 to 7.

When power is applied, the first traction control valve TCV1 and the second traction control valve TCV2 are controlled so as to maintain a pressure level required for each brake mode commonly in all braking situations.

FIG. 2 is a hydraulic circuit diagram illustrating a braking apparatus for a vehicle in accordance with an embodiment of the present invention and a view illustrating the brake mode of a Conventional Brake System (CBS) when power is not applied.

Referring to FIG. 2, when power is not applied, the first traction control valve TCV1 and the second traction control valve TCV2 are in an open state. The connection valve V1 is in a closed state.

Also, the control valve V2, configured to control the seventh flow path unit 1000, is in a closed state.

When power is not applied, braking hydraulic pressure, which is generated in the master cylinder unit 100 based on the operating force of the brake pedal 10, is transferred to the wheel cylinder unit 300 via the first flow path unit 400 and the second flow path unit 500, whereby CBS braking is performed without applying power.

FIG. 3 is a hydraulic circuit diagram illustrating a braking apparatus for a vehicle in accordance with an embodiment of the present invention and a view illustrating a mode in which the vehicle is driving without braking when power is applied.

Referring to FIG. 3, in a power-on state, power is applied to the first traction control valve TCV1, the second traction control valve TCV2, the connection valve V1, and the control valve V2.

Power is not applied to the inlet valves RLIV, FRIV, FLIV and RRIV and the outlet valves RLOV, FROV, FLOV and RROV.

In the power-on state, the first traction control valve TCV1, and the second traction control valve TCV2 are closed. The first traction control valve TCV1, and the second traction control valve TCV2 can be drained if the set pressure is exceeded.

Also, in the power-on state, the connection valve V1 and the control valve V2, which is configured to control the seventh flow path unit 1000, are open.

FIG. 4 is a hydraulic circuit diagram illustrating a braking apparatus for a vehicle in accordance with an embodiment of the present invention and a view illustrating a CBS brake mode when power is applied.

Referring to FIG. 4, in a power-on state, power is applied to the first traction control valve TCV1, the second traction control valve TCV2, the connection valve V1, and the control valve V2.

Power is not applied to the inlet valves RLIV, FRIV, FLIV and RRIV and the outlet valves RLOV, FROV, FLOV and RROV.

When operating force is applied to the brake pedal 10, the operation of the brake pedal 10 is sensed by the pedal stroke sensor 20, whereby the control valve V2 is opened based on the driver-requested braking force sensed by the pedal stroke sensor 20.

When the control valve V2 is opened, the brake oil of the master cylinder 110 is transferred to the storage tank 120.

When the control valve V2 is opened, the connection valve V1 is opened at the same time, and the first and second hydraulic pumps 210 and 220 and the third and fourth hydraulic pumps 230 and 240 in the hydraulic pump unit 200 are operated, whereby braking hydraulic pressure is generated and transferred to the wheel cylinder unit 300. Accordingly, pressure is forcibly increased.

FIG. 5 is a hydraulic circuit diagram illustrating a brake apparatus for a vehicle in accordance with an embodiment of the present invention and a view illustrating a state in which a pressure-increase mode is forcibly applied through Vehicle Dynamics Control (VDC) in a mode in which the vehicle is driving with braking when power is applied.

That is, FIG. 5 shows the emergency braking state or autonomous braking state in which the driver is not involved.

Referring to FIG. 5, in a power-on state, power is applied to the first traction control valve TCV1, the second traction control valve TCV2, the connection valve V1, and the control valve V2.

Power is not applied to the inlet valves RLIV, FRIV, FLIV and RRIV and the outlet valves RLOV, FROV, FLOV and RROV.

When it is determined that the stability of a vehicle is reduced while the vehicle is driving straight, turning or climbing a slope in a mode in which the vehicle is driven with braking in a power-on state, the control valve V2 is opened, and the first and second hydraulic pumps 210 and 220 and the third and fourth hydraulic pumps 230 and 240 in the hydraulic pump unit 200 are operated, whereby braking hydraulic pressure is generated and transferred to the wheel cylinder that requires braking force in the wheel cylinder unit 300. Accordingly, braking force is increased, and the required deceleration may be satisfied.

FIG. 6 is a hydraulic circuit diagram illustrating a brake apparatus for a vehicle in accordance with an embodiment of the present invention and a view illustrating a state in which ABS cooperative control is applied in the event of wheel lock in a CBS brake mode when power is applied.

Referring to FIG. 6, in a power-on state, power is applied to the first traction control valve TCV1, the second traction control valve TCV2, the connection valve V1, and the control valve V2.

Power is applied to the inlet valves RLIV, FRIV, FLIV and RRIV and the outlet valves RLOV, FROV, FLOV and RROV.

When it is determined that the wheels of a vehicle are locked in a CBS brake mode in a power-on state, the inlet valves RLIV, FRIV, FLIV and RRIV are closed, and the outlet valves RLOV, FROV, FLOV and RROV are opened. Accordingly, the braking hydraulic pressure transferred to the wheel cylinder unit 300 is decreased, whereby wheel lock is prevented.

FIG. 7 is a hydraulic circuit diagram illustrating a brake apparatus for a vehicle in accordance with an embodiment of the present invention and a view illustrating a state in which pressure-increase control is applied to a wheel requiring a pressure increase during ABS cooperative control.

Referring to FIG. 7, in a power-on state, power is applied to the first traction control valve TCV1, the second traction control valve TCV2, the connection valve V1, and the control valve V2.

Power is applied to the inlet valves RLIV, FRIV, FLIV and RRIV and the outlet valves RLOV, FROV, FLOV and RROV.

When a pressure increase is required in any one of the wheels of a vehicle during ABS cooperative control in a power-on state, the inlet valve (i.e., FLIV) on the side of the wheel requiring a pressure increase is opened as needed, and the outlet valve (i.e., FLOV) on the side of the corresponding wheel is closed. Accordingly, braking hydraulic pressure is transferred to the corresponding wheel cylinder (i.e., 320) in order to increase the pressure, whereby the braking force is increased for the wheel requiring the pressure increase.

As described above, according to the present invention, pump utilization efficiency may be improved, the amplitude of pulsation may be minimized, a pedal simulator function may be implemented, and required braking performance may be secured with a small number of valves.

A brake apparatus for a vehicle in accordance with the present invention may improve pump utilization efficiency, minimize the amplitude of pulsation, implement a pedal simulator function, and secure required braking performance with a small number of valves.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A brake apparatus for a vehicle, comprising:
   a master cylinder unit including a master cylinder, which has a first outlet and a second outlet and is configured to generate a braking hydraulic pressure by receiving an operating force of a brake pedal, and a storage tank, which is configured to store brake oil therein and to supply the brake oil to the master cylinder by being connected with the master cylinder;
   a hydraulic pump unit, which is configured to generate the braking hydraulic pressure separately from the master cylinder unit and which includes multiple hydraulic pumps installed so as to alternately perform a suction operation and a discharge operation by being interlocked with each other, wherein the multiple hydraulic pumps comprise an even number of hydraulic pumps so as to alternately perform the suction operation and the discharge operation by being interlocked with each other through an eccentric bearing, wherein each of the multiple hydraulic pumps has a single flow path formed by combining a suction flow path and a discharge flow path, wherein the even number of hydraulic pumps include a first hydraulic pump and a second hydraulic pump, which are installed so as to alternately perform the suction operation and the discharge operation by being interlocked with each other, and a third hydraulic pump and a fourth hydraulic pump, which are installed so as to alternately perform the suction operation and the discharge operation by being interlocked with each other;

a wheel cylinder unit configured to brake vehicle wheels by being supplied with the braking hydraulic pressure from the master cylinder unit or the hydraulic pump unit, wherein the wheel cylinder unit includes a first wheel cylinder, a second wheel cylinder, a third wheel cylinder, and a fourth wheel cylinder;

a first flow path unit configured to supply the braking hydraulic pressure to the wheel cylinder unit by connecting the first outlet of the master cylinder with the wheel cylinder unit, wherein the first flow path unit is configured to supply the braking hydraulic pressure to the first wheel cylinder and the second wheel cylinder by connecting the first outlet of the master cylinder with the first wheel cylinder and the second wheel cylinder;

a second flow path unit configured to supply the braking hydraulic pressure to the wheel cylinder unit by connecting the second outlet of the master cylinder with the wheel cylinder unit, wherein the second flow path unit is configured to supply the braking hydraulic pressure to the third wheel cylinder and the fourth wheel cylinder by connecting the second outlet of the master cylinder with the third wheel cylinder and the fourth wheel cylinder;

a third flow path unit configured to connect the storage tank with the first hydraulic pump and the second hydraulic pump;

a fourth flow path unit configured to connect the storage tank with the third hydraulic pump and the fourth hydraulic pump;

a fifth flow path unit configured to supply the braking hydraulic pressure to the first wheel cylinder and the second wheel cylinder by connecting the third flow path unit with the first wheel cylinder and the second wheel cylinder, and a sixth flow path unit configured to supply the braking hydraulic pressure to the third wheel cylinder and the fourth wheel cylinder by connecting the fourth flow path unit with the third wheel cylinder and the fourth wheel cylinder, wherein the fifth flow path unit and the sixth flow path unit are connected with each other via a connection valve.

2. The brake apparatus of claim 1, wherein in the master cylinder unit, a pedal stroke sensor configured to sense an operation of the brake pedal is installed.

3. The brake apparatus of claim 2, further comprising:
a seventh flow path unit configured to connect the master cylinder with the storage tank such that the brake oil of the master cylinder is transferred to the storage tank,
wherein a control valve configured to control the seventh flow path unit is installed in the seventh flow path unit, and the control valve controls the seventh flow path unit such that a braking operation is performed based on a driver's required braking force sensed by the pedal stroke sensor.

4. The brake apparatus of claim 1, wherein a first traction control valve and a second traction control valve are installed in the first flow path unit and the second flow path unit, respectively, the first traction control valve and the second traction control valve being configured to brake the vehicle wheels by supplying the braking hydraulic pressure generated by the master cylinder to the wheel cylinder unit.

* * * * *